(12) United States Patent
Hatazawa et al.

(10) Patent No.: US 7,776,465 B1
(45) Date of Patent: Aug. 17, 2010

(54) NONAQUEOUS ELECTROLYTE BATTERY

(75) Inventors: Tsuyonobu Hatazawa, Miyagi (JP); Tomitaro Hara, Miyagi (JP); Takahiro Endo, Miyagi (JP); Kazuhito Hatta, Miyagi (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 09/718,767

(22) Filed: Nov. 22, 2000

(30) Foreign Application Priority Data

Nov. 30, 1999 (JP) ................................. 11-341373

(51) Int. Cl.
*H01M 10/52* (2006.01)
*H01M 2/02* (2006.01)

(52) U.S. Cl. ......................................... 429/57; 429/163

(58) Field of Classification Search .................... 429/57, 429/162, 163
See application file for complete search history.

(56) References Cited

U.S. PATENT DOCUMENTS

| 4,269,905 | A | * | 5/1981 | Wedlake | 429/8 |
| 5,219,676 | A | * | 6/1993 | Bullock et al. | 429/48 |
| 5,445,856 | A | * | 8/1995 | Chaloner-Gill | 428/35.9 |
| 5,538,814 | A | * | 7/1996 | Kamauchi et al. | 429/231.8 |
| 5,607,485 | A | * | 3/1997 | Gozdz et al. | 29/623.5 |
| 5,639,573 | A | * | 6/1997 | Oliver et al. | 429/303 |

FOREIGN PATENT DOCUMENTS

| EP | 0 075132 | 3/1983 |
| EP | 0 605734 | 7/1994 |
| EP | 0 895296 | 2/1999 |
| EP | 0942485 | 9/1999 |
| JP | 06-267593 | 9/1994 |
| JP | 07220698 | 8/1995 |
| JP | 10255860 | 9/1998 |
| JP | 11-054154 | 2/1999 |
| JP | 11-191400 | 7/1999 |
| JP | 11204143 | 7/1999 |
| WO | WO95/13629 | 5/1995 |

\* cited by examiner

*Primary Examiner*—Jonathan Crepeau
(74) *Attorney, Agent, or Firm*—Sonnenschein Nath & Rosenthal LLP

(57) ABSTRACT

Disclosed is a nonaqueous electrolyte battery including a battery element contained in an outer covering member composed of a laminated film and sealed therein by heat seal, and a gas absorbable material interposed between the outermost layer of the outer covering member and the battery element. Such a battery is advantageous in that even if gas occurs in the battery element, the laminated film as the outer covering member is prevented from being swelled.

7 Claims, 6 Drawing Sheets

NONAQUEOUS ELECTROLYTE BATTERY

RELATED APPLICATION DATA

The present application claims priority to Japanese Application No. P11-341373 filed Nov. 30, 1999, which application is incorporated herein by reference to the extent permitted by law.

BACKGROUND OF THE INVENTION

The present invention relates to a nonaqueous electrolyte battery in which a battery element is contained in an outer covering member composed of a laminated film.

In recent years, along with strong demands toward reductions in size and weight in the field of portable electronic equipment such as a camera integrated VTR, a cellular phone, and a portable computer, batteries used as portable power sources of the portable electronic equipment have been also required to be reduced in size and weight. To meet such a requirement, studies have been extensively made to develop thin type or foldable type batteries, particularly, secondary batteries, more particularly, nonaqueous electrolyte batteries (so-called lithium batteries).

As an electrolyte used for the above-described foldable battery, a solid electrolyte has been actively made. In particular, a gel electrolyte composed of a solid electrolyte containing a plasticizer and a high polymer solid electrolyte including a lithium salt dissolved in a high polymer have become a focus of attention.

On the other hand, to attain the reductions in size and weight of batteries, studies have been also made to develop batteries of a type including a battery element enclosed in a plastic film or a so-called laminated film obtained by laminating a metal film to a plastic film.

The so-called laminated film, however, has a problem. For a conventional battery using a metal container, the metal container having a high rigidity is little deformed even if a pressure in the battery is raised. On the contrary, for a battery using the laminated film, if the battery is erroneously charged or discharged due to a failure of a control circuit or the like or is left under an abnormal high-temperature environment, then the laminated film having a low rigidity is possibly swelled by an increase in pressure in the battery due to gas occurred by the abnormal reaction of constituent materials of the battery.

SUMMARY OF THE INVENTION

An object of the present invention is to provide a nonaqueous electrolyte battery capable of preventing the swelling of an outer covering member composed of a laminated film, even if gas occurs in a battery element of the battery.

To achieve the above object, according to the present invention, there is provided a nonaqueous electrolyte battery including a battery element contained in an outer covering member composed of a laminated film and sealed therein by heat seal, and a gas absorbable material interposed between the outermost layer of said outer covering member and said battery element.

With this configuration, since the gas absorbable material is interposed between the outermost layer of the outer covering member and the battery element, even if gas occurs in the battery element when the battery undergoes an abnormal environmental change, for example, an abnormal temperature rise, the gas is absorbed in the gas absorbable material, with a result that the outer covering member is prevented from being swelled by the gas.

DETAILED DESCRIPTION OF THE PREFERRED EMBODIMENT

Hereinafter, an embodiment of a nonaqueous electrolyte battery of the present invention will be described with reference to the drawings.

Figure 1:
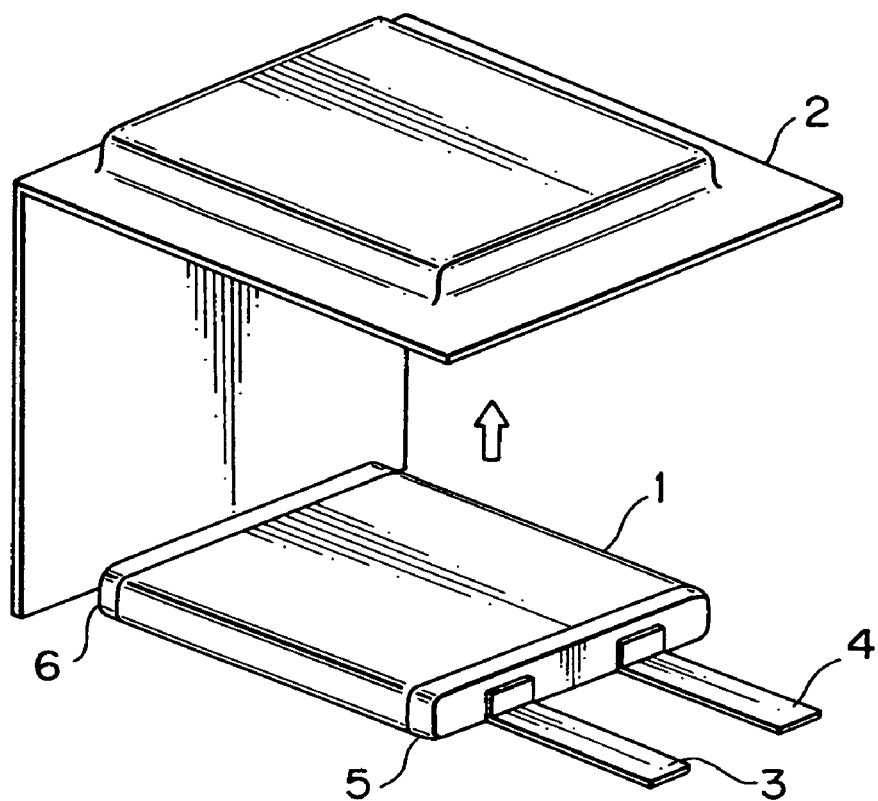
FIG. 1 is an exploded perspective view of a nonaqueous electrolyte battery according to the present invention, showing a state before a battery element is assembled in an outer covering.
Figure 2:
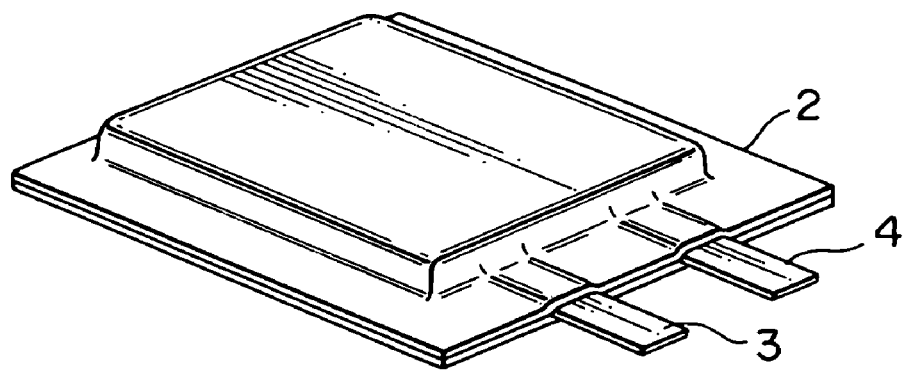
FIG. 2 is a schematic perspective view of the nonaqueous electrolyte battery shown in FIG. 1, showing a state after the battery element is assembled in the outer covering.

A nonaqueous electrolyte battery of the present invention is represented by a solid electrolyte battery or a gel electrolyte battery having a configuration shown in FIGS. 1 and 2. Referring to these figures, a battery element 1 including a solid electrolyte or a gel electrolyte interposed between a positive active material and a negative active material is contained in an outer covering member 2, typically, a laminated film and is sealed in the outer covering member 2 with its periphery bonded thereto by heat seal.

The battery element 1 has a negative electrode terminal lead 3 electrically connected to a negative electrode of the battery element 1, and a positive electrode terminal lead 4 electrically connected to a positive electrode of the battery element 1. The negative and positive electrode terminal leads 3 and 4 are led out of the outer covering member 2.

In the nonaqueous electrolyte battery according to this embodiment, gas absorbable members 5 and 6 are inserted between the outermost layer of the laminated film as the outer covering member 2 and at least one or more planes of the battery element 1. In the example shown in FIGS. 1 and 2, the battery element 1 is of a winding type, and the above-described at least one or more planes of the battery element 1 are specified by two winding end surfaces of the battery element 1. With the insertion of these gas absorbable members 5 and 6, if gas occurs in the battery element 1 due to an abnormal environmental change such as an abnormal temperature rise or overcharging, the gas is absorbed in the gas absorbable members 5 and 6, with a result that the battery is prevented from being deformed by swelling of the outer covering member 2. Each of the gas absorbable members 5 and 6 is made from a gas absorbable material and a resin material.

The gas absorbable material is represented by a porous metal compound or porous carbon material. Examples of the porous metal compounds may include zeolite, alumina, molecular sieve, titania, silica gel, and zirconia, and examples of the porous carbon materials may include activated carbon, and carbon molecular sieve.

Other than the above-described porous metal compound or porous carbon material, a metal compound selected from magnesium sulfate, calcium chloride, and phosphorus pentaoxide, or a metal selected from Ni, Pt, Pd, Ca, Sr, Ba, Ti, Zr, Hf, V, Nb, Ta, Cr, Mo, W, and Fe may be used as the gas absorbable material.

The above-described gas absorbable materials may be used singly or in combination.

Since the components and amount of gas occurring in the battery element 1 are dependent on the kinds and amounts of an electrolyte salt and an electrolyte solvent used for a gel electrolyte layer, the kind and amount of a gas absorbable material to be inserted are largely dependent on a configuration of the electrolyte and the reaction amount thereof.

The selection of the kind and amount of a gas absorbable material depending on the kind of an electrolyte and the reaction amount thereof was examined by way of the following experiment.

A sample battery of a 500 mh grade, using $LiCoO_2$ as a positive active material and graphite as a negative active material, and using 1.5 g of an electrolyte solution, was produced. In this experiment, the electrolyte solution was prepared by dissolving $LiPF_6$ as an electrolyte salt in a propylene carbonate as an electrolyte solvent exhibiting a high reactivity with graphite at a concentration of 1.0 mol/kg. After the sample battery overcharged at 4.35 V was left at 100° C. for 100 hr, gas occurred in the sample battery was analyzed using a GC-MS (Gas Chromatography-Mass Spectrometer). As a result, it was found that the reacted propylene carbonate was about 10% of the total amount inserted and that the gas mainly contained carbon dioxide, propane, propylene, and evaporated unreacted propylene carbonate.

After the sample battery was cooled to ordinary temperature, the gas remaining in the sample battery was also analyzed. As a result, it was found that carbon dioxide, propane, and propylene produced by reaction of slightly less than 10% of 1.5 g of the propylene carbonate electrolyte solution was present as the gas components. In this experiment, it was proved that the above gas components produced by the reaction (or decomposition) of about 10% of the electrolyte solution are nearly perfectly absorbable in 0.07 g of 5A carbon molecular sieve having an absorption surface area of about 3000 $m^2/g$. This means that, in the case of using 0.7 g of 5A carbon molecular sieve as the gas absorbable material, even if the propylene carbonate electrolyte solution is nearly 100% decomposed, gas components produced by such decomposition can be absorbed in the gas absorbable material.

In the above experiment, the sample battery is produced by the combination of the materials having high reactivity with each other; however, in actual, a battery is produced by combination of materials having low reactivity with each other. Accordingly, for an actual battery, the inserted amount of a gas absorbable material may become smaller than the above-described experimentally determined amount of 5A carbon molecular sieve used as the gas absorbable material.

The optimum kind and amount of the gas absorbable material, which are largely dependent on the combination of constituent materials of a battery, should be selected for each battery from the practical viewpoint.

The resin material used for each of the gas absorbable members 5 and 6 may be at least one kind or more selected from polyethylene, polypropylene, polyethylene terephthalate, polyimide, polyamideimide, polyamide, polyphenylene sulfide, tetrafluoroethylene-perfluoroalkylvinylether copolymer, polyvinylidene fluoride, polytetrafluoroethylene, ethylene fluoride-polypropylene copolymer, ethylene-tetrafluoroethylene copolymer, polyvinyl fluoride, epoxy resin, acrylic resin, and methacrylic resin.

The resin material used for each of the gas absorbable members 5 and 6 may be also at least one kind or more cross-linked resins. Examples of monomers for the cross-linked resins may include 2-hydroxyethyl (meth)acrylate, 2-hydroxypropyl (meth)acrylate, glycerol (meth)acrylate, 2-acrylamide-2-methylpropanesulfonic acid, sodium sulfonate-ethyl(meth)acrylate, (meth) acrylamide, N,N-dimethylaminoethyl(meth)acrylate, N,N-diethylaminoethyl (meth)acrylate, N-isopropylacrylamide, N,N-dimethylaminopropylacrlyamide, (meth)acrylic acid, sodium (meth)acrylate, 2-(meth)acryloyloxyethylsuccinic acid, 2-(meth)acryloyloxyethyl phthalate, 2-(meth)acryloyloxyethyl hexahydrophthalate, ω-carboxy-polycaprolactonemonoacrylate, EO modified phosphoric (meth)acrylate, polyethyleneglycol (meth)acrylate, acryloylmorpholine, p-styrenesulfonic acid, vinylsulfonic acid, allylsulfonic acid, (meth)acrylic ethylsulfonic acid, (poly)ethyleneglycol di(meth)acrylate (for example, produced by Shin-Nakamura Chemical Co., Ltd. under the trade names of NK Ester A-200, A-400, A-600, A-1000, 4G, 9G, 14G, and 23G; and produced by Kyoueisha Chemical Co., Ltd. under the trade names of Light Ester 4EG, 9EG, 14EG, 9EG-A, and 14EG-A), (poly)ethyleneglycol mono(meth)acrylate (for example, produced by Shin-Nakamura Chemical °Co., Ltd. under the trade names of NK Ester AMP-10G, AMP-20G, AMP-60G, and AMP-90G; and produced by Kyoueisha Chemical Co., Ltd. under the trade names of Light Ester MC, 130MA, and 041MA), and ethoxyeated polypropyleneglycol dimethacrylate (produced by Shin-Nakamura Chemical Co., Ltd. under the trade name of NK Ester 1206PE). These materials may be hardened by irradiation of heat, ultraviolet rays, visual light, electron rays, or radiation thereto.

In the case of adopting the hardening process by irradiation of ultraviolet rays, a material activated by ultraviolet rays may be used as an initiator. Examples of such initiators may include a sulfide such as sodium methyldithiocarbamate sulfide, tetramethylthiuram monosulfide, diphenyl monosulfide, dibenzothiazoyl monosulfide, or disulfide; thioxanthone, and a derivative thereof such as ethylthioxanthone, 2-chlorothioxanthone, diethylthioxanthone, or diisopropylthioxanthone; a diazo compound such as hydrazone, azoisobutyronitrile, or benzenediazonium; an aromatic carbonyl compound such as benzoin, benzoinmethylether, benzomethylether, benzoinisopropylether, benzophenone, dimethylaminobenzophenone, Michler's ketone, benzilanthraquinone, t-butylanthraquinone, 2-methylanthraquinone, 2-ethylanthraquinone, 2-aminoanthraquinone, 2-chloroanthraquinone, benzildimethyl ketal, or methylphenyl glyoxylate; an acetophenone derivative such as 1-hydroxycyclohexyl phenyl ketone, 2-hydroxy-2-methyl-1-phenylpropane-1-on, 4-(2-hydroxyethoxy)phenyl(2-hydroxy-2-propyl) ketone, 2,2-diethoxyacetophenone, or 2,2-dimethoxyacetophenone; a dialkylamino benzoate such as 4-dimethylaminomethyl zenboate, 4-dimethylaminoethyl zenboate, 4-dimethylaminobutyl zenboate, or 4-dimethylaminoisopropyl zenboate; a peroxide such as benzoil peroxide, di-t-butyl peroxide, dicumyl peroxide, or cumene hydroperoxide; an acridine derivative such as 9-phenylacridine, 9-p-methoxyphenylaciridine, 9-acethylaminoacridine, or benzacridine; a phenazine derivative such as 9,10-dimethylzenzphenazine, 9-methylbenzphenazine, or 10-methoxybenzphazine; a quinoxaline derivative such as 4,4',4''-trimethoxy-2,3-diphenylquinoxaline; 2,4,5-triphenylimidazoyl dimer; ketone halide; and an acylated phosphide such as acylphosphine oxide or acylphosphonate.

In the case of adopting the hardening process by irradiation of visual light, a material activated by visual light may be used as an initiator. Examples of such initiators may include 2-nitrofluorene, 2,4,6-tris(trichloromethyl)-1,3,5-triazine, 3-3'-carbonylbiscoumarin, and thio-Michler's ketone.

The above-described initiators may be used singly or in combination.

The added amount of the initiator may be in a range of 0.01 to 20 parts by weight, preferably, in a range of 0.1 to 5 parts by weight. If the added amount of the initiator is less than 0.01 part by weight, the initiator cannot sufficiently exhibit the effect of promoting the crosslinking reaction, with a result that the crosslinking point is lowered and thereby the produced cross-linked resin tends to become softer. Meanwhile, if the added amount of the initiator is more than 20 parts by weight, the initiator excessively promotes the crosslinking reaction, with a result that the produced cross-linked resin tends to become brittle and be changed in color.

In the case of irradiation of ultraviolet rays as activation rays, an extra-high pressure mercury lamp, a high pressure mercury lamp, a metal halide lamp, xenon lamp, or a low pressure bactericidal lamp may be used as an irradiation source. The irradiation amount of ultraviolet rays, which is dependent on the kind of a monomer, and the added amount of a photochemical polymerization initiator, may be set in a range of 10 mJ/cm$^2$ to 10 J/cm$^2$. In this case, to prevent adverse effect of oxygen, the irradiation of ultraviolet rays may be performed in an inert gas atmosphere or in a state in which the environmental atmosphere is cutoff by using glass or a transparent film.

Each of the gas absorbable members 5 and 6 is obtained by mixing a powder of the above described gas absorbable material with the above-described resin material and hardening the mixture into a suitable shape, for example, a plate-shape. If a thermoplastic resin is selected as the resin material, the resin mixed with the gas absorbable material may be kneaded and extrusion-molded or injection-molded into a desired shape.

The content of the gas absorbable material may be set in a range of about 0.1 wt % to 95 wt % on the basis of the weight of the resin material. If the content of the gas absorbable material is less than 0.1 wt %, the gas absorption function of the gas absorbable material becomes insufficient, and if the content is more than 95 wt %, it becomes difficult to form the gas absorbable member by molding.

In actual, as described above, since the kind and amount of gas occurring in a battery element are largely dependent on the combination of constituent materials of a battery, the amount of the gas absorbable material may be desirable to be suitably selected for each actual battery.

Assuming that the shortest direction of a battery is defined as the thickness direction of the battery, it is important to make the thickness of the battery as thin as possible while keeping constant the capacity of the battery. However, if the gas absorbable member is inserted in the thickness direction between the battery element 1 and the outer covering member, the thickness of the battery is increased. For a battery having a thickness of 3 mm, if the thickness of the battery is increased by 100 μm, the volume energy efficiency of the battery is degraded by 3%, and for a battery having a thickness of 0.5 mm, if the thickness of the battery is increased by 100 μm, the volume energy efficiency of the battery is degraded by 20%. It should be noted that the relationship between an increase in thickness of the battery and a loss of volume energy efficiency thereof is actually dependent on the shape of the battery. Now, assuming a battery to have a shape similar to that of a business card and to have a thickness of 3 mm or more, by inserting the plate-shaped gas absorbable members 5 and 6 between the battery element 1 and the laminated film as the outer covering member 2 as shown in FIG. 1, it is possible to ensure an amount gas absorbable material sufficient for gas absorption while suppressing the volume energy efficiency as much as possible.

In the case of using the plate-shaped gas absorbable member, the thickness thereof may be in a range of 50 μm to 1.0 mm, preferably, in a range of 100 μm to 500 μm. If the thickness is more than 1.0 mm, a loss of volume energy density becomes larger, and if the thickness is less than 50 μm, the formation of the gas absorbable member by molding becomes difficult although the amount of the gas absorbable material becomes sufficient.

In this way, in the nonaqueous electrolyte battery of the present invention, in which the battery element having a positive electrode and a negative electrode is enclosed in the laminated film as the outer covering member, the gas absorbable member may be inserted between a certain portion of the battery element and the outermost layer of the laminated film.

Figure 3:
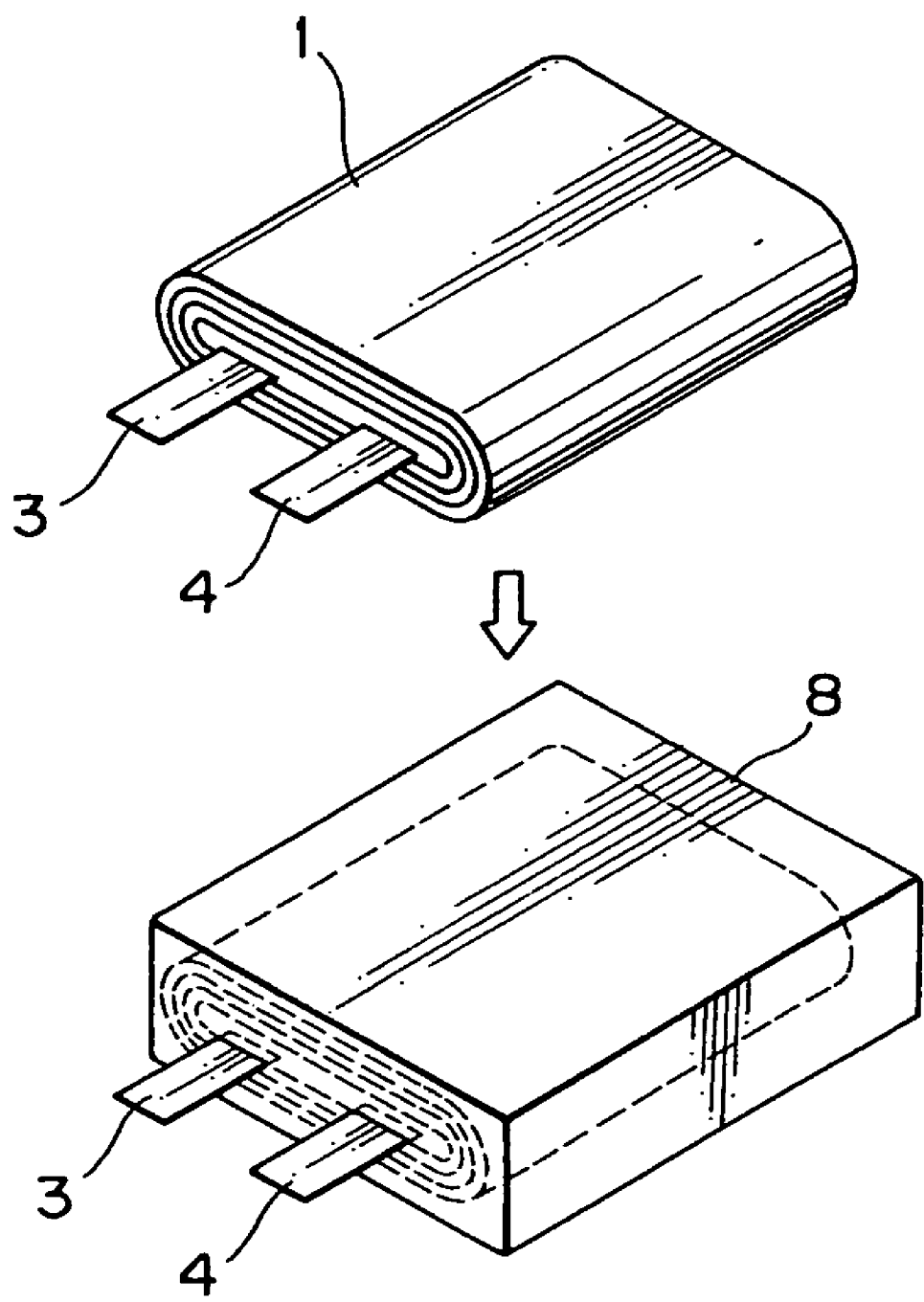
FIG. 3 is a schematic perspective view showing a state in which the entire surface of the battery element is covered with a gas absorbable member.
Figure 4:
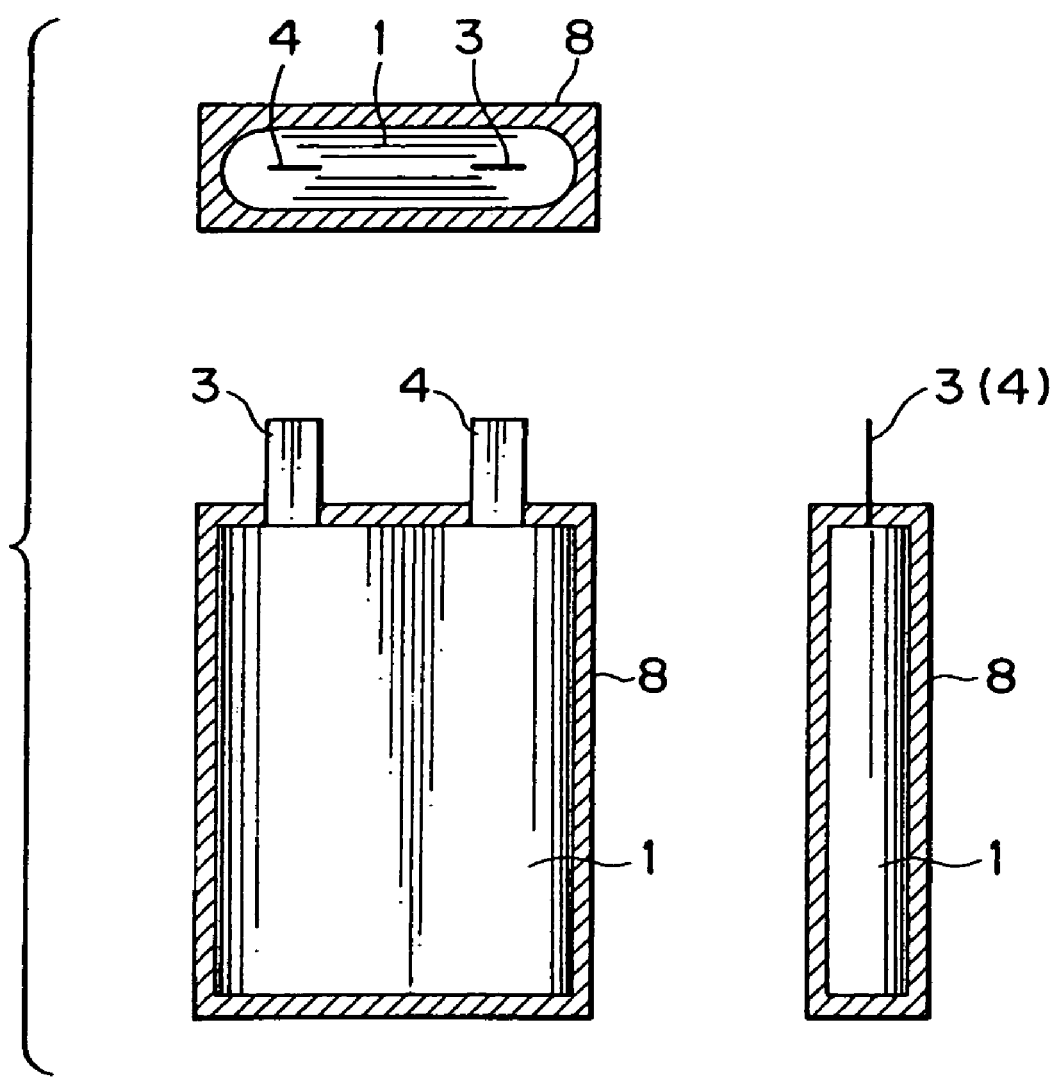
FIG. 4 is front, top, and side views showing volume loss portions in the state shown in FIG. 3 in which the entire surface of the battery element is covered with a gas absorbable member.

With respect to the arrangement of the gas absorbable member, if the entire surface of the battery element 1 is covered with the gas absorbable member 8 as shown in FIG. 3, it is possible to easily achieve the object of absorbing gas occurred in the battery element 1; however, in this case, the volume loss portions become larger as shown by hatching in FIG. 4, with a result that the rate of the portions other than the battery element 1 occupied in the battery case having a limited volume becomes higher and thereby the volume energy efficiency of the battery is degraded.

Accordingly, the gas absorbable member containing the gas absorbable material according to the present invention may be arranged at a specific location.

The arrangement of the gas absorbable member will be described in detail with reference to FIGS. 5 to 8.

Figure 5:
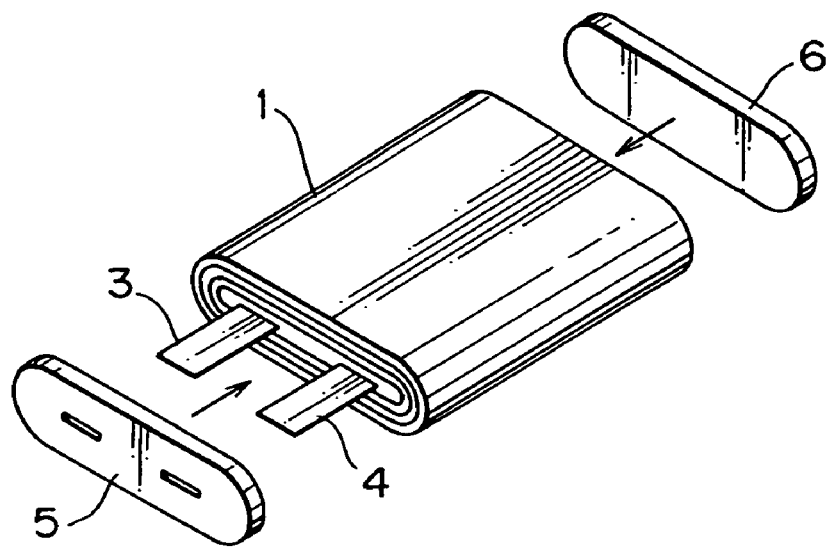
FIG. 5 is a schematic perspective view showing a state in which gas absorbable members previously formed by molding are attached to the battery element.

As shown in FIG. 5, the thin plate-shaped gas absorbable members 5 and 6 previously formed by molding are attached to the battery element 1, and the battery element 1 to which the members 5 and 6 are attached is enclosed by the laminated film. In an alternative, the battery element 1 is coated with a hardening resin containing the gas absorbable material, followed by hardening of the resin mixture, and the battery element 1 covered with the gas absorbable material is enclosed by the laminated film.

Figure 6:
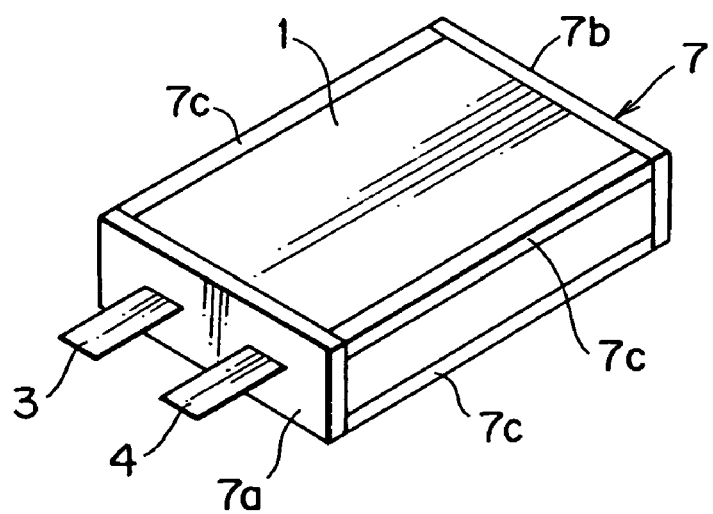
FIG. 6 is a schematic perspective view showing a state in which a gas absorbable member is formed in a space between the outer covering member and the battery element by filling the space with a resin mixture containing a gas absorbable material.

In the case of using the laminated film having a battery containing recess at a certain location of the film, there may be adopted an arrangement method of containing the battery element in the recess of the laminated film, filling the space between the wall of the recess and the battery element with a hardening material containing the gas absorbable material, hardening the resin mixture, and enclosing the battery by the laminated film. In this case, as shown in FIG. 6, the gas absorbable member 7 is formed around the battery element 1.

The gas absorbable material may be contained in one film layer, positioned in proximity to the battery, of the film layers constituting the laminated film.

Figure 7:
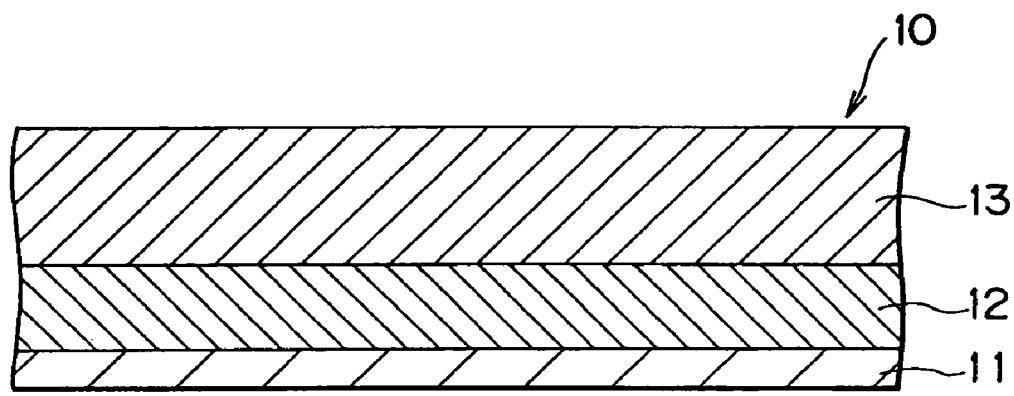
FIG. 7 is a sectional view showing a laminated film having a gas absorbable layer.
Figure 8:
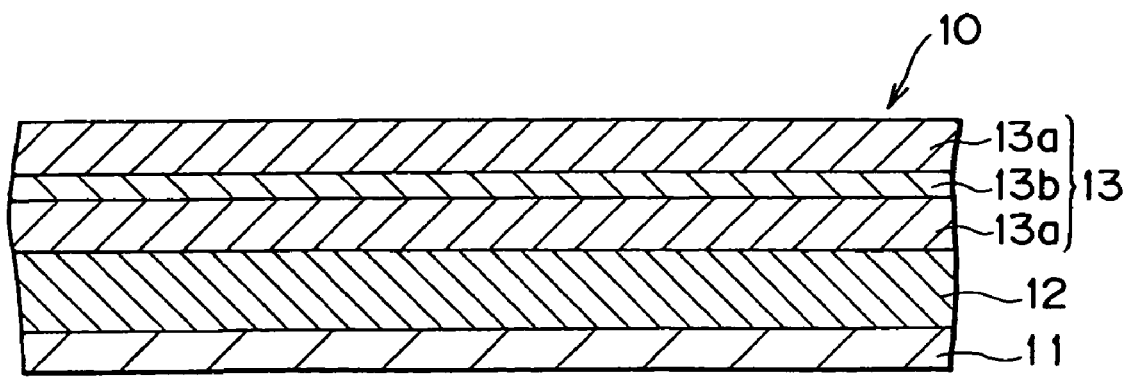
FIG. 8 is a sectional view showing another laminated film having a gas absorbable layer.

FIG. 7 shows a laminated film 10 having one gas absorbable layer. The laminated film 10 has a resin layer 11 having a thickness of about 10 µm made from nylon or polyethylene terephthalate or the like, an aluminum layer 12 having a thickness of 20 µm to 40 µm made from aluminum, and a gas absorbable layer 13 having a thickness of 30 µm to 50 µm made from a resin, typically, modified cast polypropylene (CPP) in which the gas absorbable material is diffused. These layers 11, 12, and 13 are stacked in this order from the outside in FIG. 7. FIG. 8 shows a variation of the laminated film 10. In this variation, the gas absorbable layer 13 includes a pair of resin layers 13a made from a resin, typically, modified cast polypropylene and a gas absorbable material 13b held between the resin layers 13a.

In the case of providing the gas absorbable layer as one of the layers constituting the laminated film, the thickness thereof may be in a range from 1 µm to 500 µm, preferably, in a range from 5 µm to 100 µm. If the thickness is more than 500 µm, the loss of volume energy density becomes larger, and if the thickness is less than 1 µm, it is difficult to ensure a sufficient amount of the gas absorbable material.

Next, the configuration of the battery element 1 will be described below.

For a solid electrolyte battery or gel electrolyte battery, a high polymer material is used for a high polymer solid electrolyte. Examples of the high polymer materials may include silicon gel, acrylic gel acrylonitrile gel, polyphosphazene modified polymer, polyethylene oxide, polypropylene oxide, and combined polymers, cross-linked polymers, and modified polymers thereof; and fluorine based polymers such as polyvinylidene fluoride, a vinylidene fluoride-hexafluoropropylene copolymer, vinylidene fluoride-tetrafluoroethylene copolymer, and vinylidene fluoride-trifluoroethylene copolymer, and mixtures thereof.

A solid electrolyte or gel electrolyte stacked on a positive active material layer or negative active material layer is obtained by impregnating the positive active material layer or negative active material layer with a solution containing a high polymer compound, an electrolyte salt, and a solvent (and further, a plasticizer for the gel electrolyte), and removing the solvent to solidify the high polymer compound and electrolyte salt. Accordingly, the solid electrolyte or gel electrolyte stacked on the positive active material layer or negative active material layer is partially impregnated in the positive active material layer or negative active material layer. In the case of using a cross-linking high polymer compound, after the removal of the solvent, the high polymer compound is cross-linked by light or heat.

The gel electrolyte is composed of a plasticizer containing a lithium salt, and a matrix high polymer in an amount of 2 wt % to 30 wt %. In this case, an ester, an ether, and a carbonate may be used singly or in combination as one component of the plasticizer.

In preparation of the gel electrolyte, as the matrix high polymer for gelling such a carbonate, there may be used any one of high polymers having been generally used for a usual gel electrolyte. In particular, a fluorine based high polymer such as polyvinylidene fluoride, or vinylidene fluoride-hexafluoropropylene copolymer may be preferably used as the matrix high polymer from the viewpoint of stability of oxidation/reduction.

The high polymer solid electrolyte is composed of a lithium salt and a high polymer compound for dissolving the lithium salt. Examples of the high polymer compounds may include an ether based high polymer such as polyethylene oxide or a cross-linked high polymer thereof, a polymethacrylate ester based high polymer, an acrylate based high polymer, and a fluorine based high polymer such as polyvinylidene fluoride or vinylidene-hexafluoropropylene copolymer. These high polymers may be used singly or in combination. In particular, the fluorine based high polymer such as polyvinylidene fluoride or vinylidene-hexafluoropropylene copolymer may be preferably used as the high polymer compound from the viewpoint of stability of oxidation/reduction.

As the lithium salt contained in the gel electrolyte or high polymer solid electrolyte, there can be used any one of the lithium salts having been generally used for a usual battery electrolyte. In particular, there may be used the lithium compounds (salts) such as lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis(trifluoromethanesulfonyl)imide, $LiAsF_6$, $LiCF_3SO_3$, $LiC(SO_2CF_3)_3$, $LiAlCl_4$, and $LiSiF_6$. These lithium compounds may be used singly or in combination.

Of these lithium compounds, lithium hexafluorophosphate ($LiPF_6$) and lithium tetrafluoroborate ($LiBF_4$) may be preferably used from the viewpoint of stability of oxidation.

For the gel electrolyte, the lithium salt may be dissolved in the plasticizer at a concentration of 0.1 to 3.0 mol/l, preferably, 0.5 to 2.0 mol/l.

The components of the battery of the present invention, other than the above-described gel electrolyte containing a carbonate or the solid electrolyte may be the same as those of a usual lithium ion battery.

For example, the negative electrode of the battery of the present invention may be made from a negative electrode material used for a usual lithium ion battery, typically, a carbon material such as a graphitization-retardant carbon material or a graphite based material in or from lithium can be doped or undoped. Examples of such carbon materials may include pyrocarbon, coke such as pitch coke, needle coke, or petroleum coke, graphite, vitreous carbon, a baked body of an organic high polymer compound (carbonization of phenol resin or furan resin by baking it at a suitable temperature), carbon fibers, and activated chacoal. As the material in or from which lithium can be doped or undoped, there may be also used polyacetylene, a high polymer such as polypyrrole or an oxide such as $SnO_2$. In formation of the negative electrode by using the above material, a known binder may be added thereto.

The positive electrode of the battery of the present invention may be configured by using a positive active material used for a usual lithium ion battery, typically a material selected from a metal oxide, a metal sulfide, or a specific high polymer in accordance with the kind of the battery. Examples of the positive active materials may include a metal sulfide not containing lithium such as $TiS_2$, $MoS_2$, or $NbSe_2$, a metal oxide not containing lithium such as $V_2O_5$, and a composite metal oxide containing lithium expressed by a chemical structure formula $Li_xMO_2$ (M is one kind or more transition metals, and x is variable depending on the charging/discharging state of the battery, and is usually set in a range of 0.05 to 1.10). In the composite metal oxide $Li_xMO_2$, the transition metal may be selected from Co, Ni and Mn. Examples of the composite metal oxide $Li_xMO_2$ may include $LiCoO_2$, $LiNO_2$, and $LiNi_yCo_{1-y}O_2$ (0<y<1). The composite metal oxide $Li_xMO_2$ can constitute a positive active material capable of generating a high voltage and enhancing the energy density. A plurality of these positive active materials may be combined to form the positive electrode. In formation of the positive electrode by using the above positive active material, a known conductive agent and a known binder may be used.

Electrode terminals (negative terminal lead 3 and positive electrode terminal lead 4) are connected to collectors of the negative and positive electrodes, respectively. The positive electrode may be made from a metal not melted at a high potential, such as aluminum, titanium, or an alloy thereof, and the negative electrode may be made from copper, nickel, or an alloy thereof.

These electrode terminals are folded at winding terminal surfaces of the battery element 1 in such a manner as to be at the same level as that of the principal plane of the battery element 1 in order to improve the volume efficiency and to be easily led out of the battery element 1. The gas absorbable members 5 and 6 or the gas absorbable member 7 can effectively function from the viewpoint of prevention of short-circuit, and also function as a shock absorber.

The nonaqueous electrolyte battery may be used as a primary battery or secondary battery; however, it may be preferably used as a lithium ion secondary battery using a solid electrolyte or gel electrolyte.

The effects of the present invention will be more clearly understood by way of the following examples in which characteristics of sample batteries are variously evaluated.

Example 1

Production of Sample Battery

First, a negative electrode was produced as follows:

A negative electrode depolarizing mix was prepared by mixing 90 parts by weight of a pulverized powder of graphite and 10 parts by weight of vinylidene fluoride-hexafluoropropylene copolymer. The negative electrode depolarizing mix was then diffused in N-methyl-2-pyrrolidone into slurry. The slurry was applied on one surface of a strip-like copper foil, as a negative electrode collector, having a thickness of 10 μm, being dried, and compressed by a roll press, to produce a negative electrode.

A positive electrode was produced as follows:

First, a positive active material ($LiCoO_2$) was obtained by mixing lithium carbonate and cobalt carbonate at a mol ratio of 0.5:1, and the resultant mixture was baked at 900° C. for 5 hr. A positive electrode depolarizing mix was prepared by mixing 91 parts by weight of the positive active material ($LiCoO_2$), 6 parts by weight of graphite as a conductive agent, and 10 parts by weight of vinylidene-hexafluoropropylene copolymer as a binder. The positive electrode depolarizing mix was then diffused in N-methyl-2-pyrrolidone into slurry. The slurry was applied on one surface of a strip-like aluminum foil, as a positive electrode collector, having a thickness of 20 μm, being dried, and compressed by a roll press, to produce a positive electrode.

A positive electrode terminal lead and a negative electrode terminal lead were welded on portions, where the active materials were not formed, of the positive electrode (aluminum foil) and the negative electrode (copper foil), respectively.

A gel electrolyte was obtained as follows:

First, a plasticizer was prepared by mixing 42.5 parts by weight of ethylene carbonate (EC), 42.5 parts by weight of propylene carbonate (PC), and 15 parts by weight of $LiPF_6$. An electrolyte solution was obtained by mixing and dissolving 30 parts by weight of the plasticizer and 10 parts by weight of vinylidene fluoride-hexafluoropropylene copolymer having a weight-average molecular weight Mw of 600,000 in 60 parts by weight of diethyl carbonate. The electrolyte solution was applied on the negative and positive electrodes, being impregnated therein, and left at ordinary temperature for 8 hr to evaporate the dimethyl carbonate, to thereby obtain a gel electrolyte.

Figure 9:
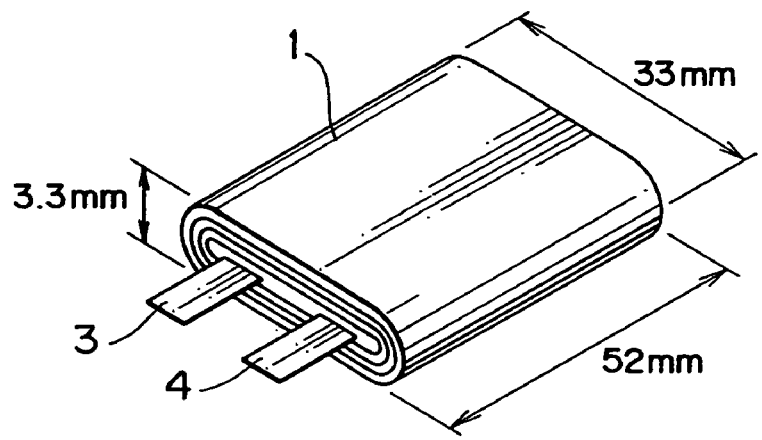
FIG. 9 is a schematic perspective view showing dimensions of a winding type battery element produced in Examples 1, 2 and 3.

The gel electrolyte sides of the negative and positive electrodes coated with the gel electrolyte were laminated to each other, being pressed and wound, to produce a winding type gel electrolyte battery element 1 (capacity: 550 mAh) having a size of 3.3 cm×5.2 cm×3.3 mm shown in FIG. 9.

Next, a hardening resin composition was obtained by mixing 30 parts by weight of NK Ester 1206PE (trade name, produced by Shin-Nakamura Chemical Co., Ltd.), 25 parts by weight of NK Ester 23G (trade name, produced by Shin-Nakamura Chemical Co., Ltd.), 40 parts by weight of carbon molecular sieve having an average particle size of 3 μm (pulverized after vacuum heating and drying at 120° C. for 24 hr), and 0.5 part by weight of 1173 (trade name, produced by Ciba-Geigy Limited) as a hardening agent, and vacuum degassing the resultant mixture. The hardening resin composition was irradiated with ultraviolet rays having an energy of 20 mJ/cm² for 1 min by using a high pressure mercury lamp to be solidified, to produce a plate-like gas absorbable member having a size of 3.3 cm×3.3 mm×0.3 mm. In addition, the production of the above gas absorbable member was performed in a glove box filled with argon gas disposed in a dry room having a dew point of −45° C.

The battery element and the gas absorbable member thus produced were inserted in an outer covering member composed of a laminated film, and were sealed therein by heat-sealing the periphery of the outer covering member along a seal width of 5 mm for at 200° C. for 10 sec by a heat sealer, to produce a sample battery.

Example 2

A sample battery was produced in the same manner as that in Example 1, except that diethyl carbonate was used in place of propylene carbonate constituting part of the plasticizer, and the content of the carbon molecular sieve having an average particle size of 3 μm was changed from 40 parts by weight into 32 parts by weight.

Example 3

A sample battery was produced in the same manner as that in Example 1, except that 85 parts by weight of propylene carbonate was used in place of the mixed solvent of 42.5 parts by weight of ethylene carbonate and 42.5 parts by weight of propylene carbonate constituting parts of the plasticizer, and a pulverized powder of silica gel having an average particle size of 5 μm was used in place of the carbon molecular sieve having an average particle size of 5 μm.

Example 4

Figure 10:
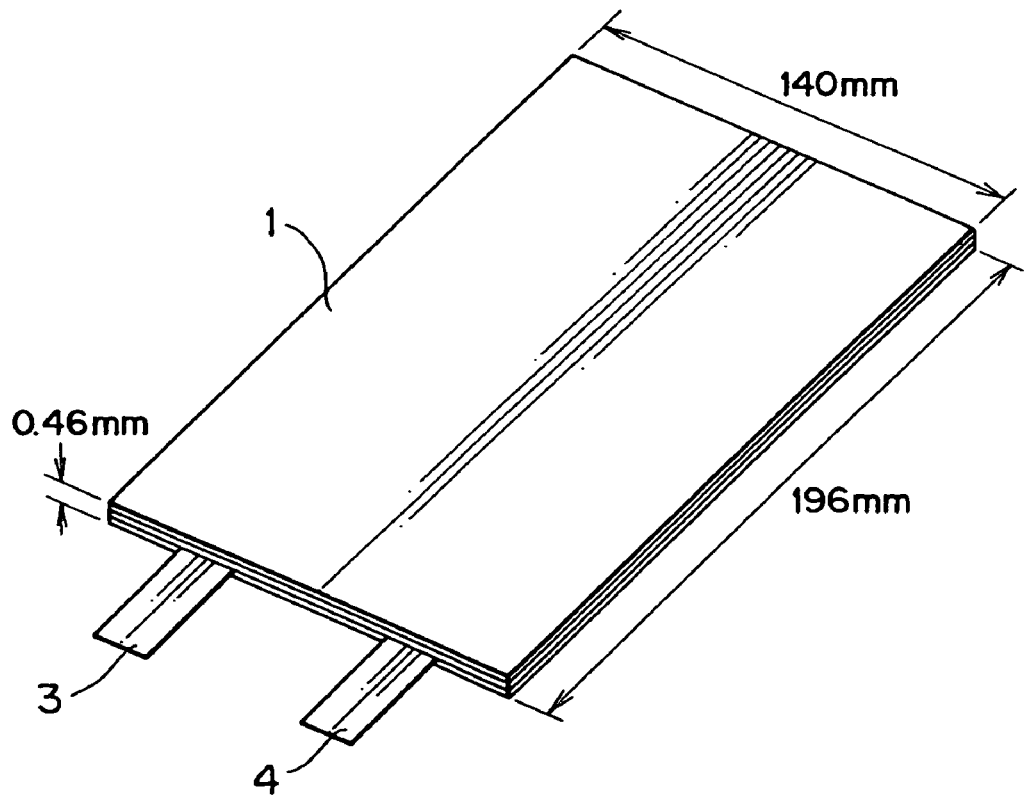
FIG. 10 is a schematic perspective view showing dimensions of a flat type battery element produced in Examples 4, 5 and 6.

A sample battery was produced in the same manner as that in Example 1, except that a plate-like gel electrolyte battery element of a capacity of 1200 mAh having a size of 140 mm×196 mm×0.46 mm shown in FIG. 10 was produced in place of the winding type gel electrolyte battery element, and a laminated film having a gas absorbable layer containing carbon molecular sieve having an average particle size of 3 μm shown in FIG. 8 was used in place of the flat-like gas absorbable member.

Example 5

A sample battery was produced in the same manner as that in Example 4, except that diethyl carbonate was used in place of propylene carbonate constituting part of the plasticizer.

Example 6

A sample battery was produced in the same manner as that in Example 4, except that 85 parts by weight of propylene carbonate was used in place of the mixed solvent of 42.5 parts by weight of ethylene carbonate and 42.5 parts by weight of propylene carbonate constituting parts of the plasticizer, and a pulverized powder of silica gel having an average particle size of 5 μm was used in place of the carbon molecular sieve having an average particle size of 3 μm.

Comparative Example 1

A sample battery was produced in the same manner as that in Example 1, except that the carbon molecular sieve as the gas absorbable material was not used.

Comparative Example 2

A sample battery was produced in the same manner as that in Example 2, except that the carbon molecular sieve as the gas absorbable material was not used.

Comparative Example 3

A sample battery was produced in the same manner as that in Example 3, except that the pulverized powder of silica gel as the gas absorbable material was not used.

Comparative Example 4

A sample battery was produced in the same manner as that in Example 4, except that the carbon molecular sieve as the gas absorbable material was not used.

Comparative Example 5

A sample battery was produced in the same manner as that in Example 5, except that the carbon molecular sieve as the gas absorbable material was not used.

Comparative Example 6

A sample battery was produced in the same manner as that in Example 6, except that the pulverized powder of silica gel as the gas absorbable material was not used.

Each of the sample batteries in Examples 1 to 6 and Comparative Example 1 to 6 was evaluated in terms of the ability of absorbing gas occurred in the battery element by battery reaction.

Each sample battery was initially charged at 5-hour rate of the theoretical capacity (⅕ C), and over-charged to 4.35 V at 2-hour rate of the theoretical capacity (½ C). The sample battery in the over-charged state was left in a thermostat kept at 100° C. for 100 hr.

After being left for 100 hr, the sample battery was taken out of the thermostat, and the swelling degree of the laminated film was visually observed at a time point directly after the sample was taken out of the thermostat and at a time point after the sample battery was cooled to ordinary temperature.

The criterion of evaluating the swelling degree of the laminated film was set as follows:

A sample battery, in which the laminated film is not swelled, the adhesion between the battery element and the laminated film is kept, and the battery shape is kept, is evaluated as a mark ○; a sample battery, in which the battery shape is substantially kept, but the battery element is separated from the laminated film whereby the adhesion is not kept, is evaluated as a mark Δ; and a sample battery, in which the laminated film is swelled and the battery shape is not kept, is evaluated as a mark x.

The results of evaluating the gas absorbing abilities of the sample batteries in Examples 1 to 6 and Comparative Examples 1 to 6 are shown in Table 1.

TABLE 1

|  | Observation Result[1] | Observation Result[2] |
|---|---|---|
| Example 1 | ○ | ○ |
| Example 2 | Δ | ○ |
| Example 3 | ○ | ○ |
| Example 4 | ○ | ○ |
| Example 5 | Δ | ○ |
| Example 6 | ○ | ○ |
| Comparative Example 1 | X | X |
| Comparative Example 2 | X | X |
| Comparative Example 3 | X | X |
| Comparative Example 4 | X | X |
| Comparative Example 5 | X | X |
| Comparative Example 6 | X | X |

Observation Result[1]: directly after the sample battery is taken out of the thermostat
Observation Result[2]: after the sample battery is cooled to ordinary temperature As is apparent from Table 1, in each of the sample batteries in Examples 2 and 5, the laminated film is loosened directly after the sample battery is taken out of the thermostat kept at 100° C.; however, in each of the sample batteries in Examples 1 to 6, in the state after the sample battery is cooled to ordinary temperature, the laminated film is not loosened, the adhesion between the battery element and the laminated film is kept, and the battery shape is kept.

On the contrary, in each of the sample batteries in Comparative Examples 1 to 6, the laminated film is swelled and the battery shape is not kept directly after the sample battery is taken out of the thermostat kept at 100° C., and the swelling of the laminated film is left after the sample battery is cooled to ordinary temperature.

As a result, according to the nonaqueous electrolyte battery, since the gas absorbable material is inserted between the battery element and the laminated film or contained in the laminated film, even if the battery undergoes an abnormal environmental change such as overcharging or an abnormal temperature rise, gas occurred in the battery element is absorbed in the gas absorbable material, with a result that a change in shape of the battery due to the swelling of the laminated film can be suppressed.

While the preferred embodiments of the present invention have been described using the specific terms, such description is for illustrative purposes only, and it is to be understood that changes and variations may be made without departing from the spirit or scope of the following claims.

What is claimed is:

1. A nonaqueous electrolyte battery comprising:
   an outer covering member including a laminated film having an outermost layer;
   a battery element contained in the outer covering member and sealed therein by heat seal, the battery element having a positive electrode and a negative electrode each having a gel electrolyte at a portion thereof, the portions of the positive and negative electrodes being laminated to each other and pressed and wound such that the battery element is a winding type gel electrolyte battery element, the battery element having a first end at which first wound edges are located and a second end, which is opposite the first end, at which second wound edges are located, the gel electrolyte comprising a plasticizer containing a lithium salt and a matrix high polymer in an amount of 2 wt % to 30 wt %, the matrix high polymer comprising a fluorine based high polymer selected from the group of polyvinylidene fluoride and vinylidene fluoride-hexafluoropropylene copolymer, the outer covering member including a gas absorbable material and resin material interposed between the outermost layer of said outer covering member and said battery element, the gas absorbable material being one of molecular sieve and silica gel, a content of the gas absorbable material being in a range of 0.1 wt % to 95 wt % on a basis of a weight of the resin material, the gas absorbable material and the resin material having a thickness in a range of 1 μm to 500 μm;

a first gas absorbable member positioned at the first end of the battery element adjacent the first wound edges of the battery element and positioned between the battery element and the outer covering member, the first gas absorbable member not being a part of the outer covering member; and a second gas absorbable member positioned at the second end of the battery element adjacent the second wound edges of the battery element and positioned between the battery element and the outer covering member, the second gas absorbable member not being a part of the outer covering member;

said first and second gas absorbable members each being a continuous solid plate-like member and each comprising a gas absorbable material powder hardened within a resin material;

said outer covering member having a first outer covering member and a second outer covering member, the first outer covering member and the second outer covering member being a single common piece of material;

said first outer covering member having a recessed portion accommodating the battery element;

said second outer covering member extending from one side of the first outer covering member and folded onto the first outer covering member covering the battery element and the recessed portion.

2. A nonaqueous electrolyte battery according to claim 1, wherein said gas absorbable material is carbon molecular sieve.

3. A nonaqueous electrolyte battery according to claim 1, wherein first and second gas absorbable members each include a second gas absorbable material that is mixed with a second resin material and the mixture is molded to form said first and second gas absorbable members, and said first and second gas absorbable members are inserted between the outermost layer of said outer covering member and at least one or more planes of said battery element.

4. A nonaqueous electrolyte battery according to claim 1, wherein the negative electrode of said battery element contains a material in or from which lithium is allowed to be doped or undoped.

5. A nonaqueous electrolyte battery according to claim 4, wherein said material in or from which lithium is allowed to be doped or undoped is a carbon material.

6. A nonaqueous electrolyte battery according to claim 1, wherein the positive electrode of said battery element contains a composite oxide of lithium and a transition metal.

7. A nonaqueous electrolyte battery according to claim 1, wherein said battery is a secondary battery.

* * * * *